United States Patent [19]

Plough et al.

[11] 3,826,924

[45] July 30, 1974

[54] TEMPERATURE COMPENSATED THERMAL RELAY DEVICE

[75] Inventors: Charles T. Plough, Beaconsfield; Jan Otto Tvedt, Pierrefonds; Marcus Arts, Longueuil; H. Keith Eastwood, Beaconsfield; Frank Woo, Dollard Des Ormeaux, Quebec, all of Canada

[73] Assignee: Multi-State Devices Ltd., Dorval, Quebec, Canada

[22] Filed: May 21, 1973

[21] Appl. No.: 362,294

[52] U.S. Cl............. 307/117, 219/505, 317/148.5 B
[51] Int. Cl........................................... H01h 37/00
[58] Field of Search ............ 307/117; 219/504, 505; 317/148.5 R, 148.5 B; 323/68

[56] References Cited
UNITED STATES PATENTS

| | | | |
|---|---|---|---|
| 2,386,903 | 10/1945 | Lutomirski | 219/505 X |
| 3,548,293 | 12/1970 | Hirsbrunner | 307/117 |

Primary Examiner—Robert K. Schaefer
Assistant Examiner—M. Ginsburg
Attorney, Agent, or Firm—Spencer & Kaye

[57] ABSTRACT

A temperature compensated thermal relay device comprises a thermal switching element exhibiting a sudden change in impedance at a predetermined transition temperature from a first impedance state to a second impedance state, a heater adapted to be connected to a power source for heating the thermal switching element, and circuit means for initially supplying a large amount of power to the heater so as to make the switching element exceed its transition temperature quickly and for subsequently reducing the power applied to the heater to maintain the thermal switching element a few degrees above its transition temperature. The circuit means also controls the power applied to the heater to stabilize the operation of the thermal switching element under varying ambient or operating temperature. The above circuit means permit to reduce the turn-on and turn-off times of the thermal switching element.

17 Claims, 10 Drawing Figures

PATENTED JUL 30 1974　　3,826,924
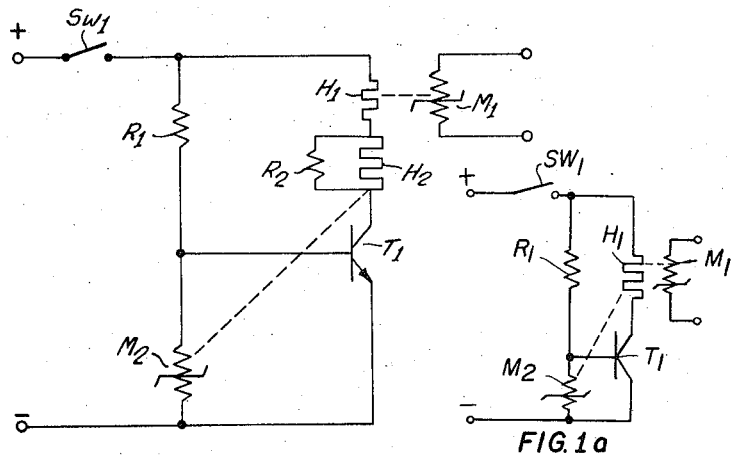
FIG. 1
FIG. 1a
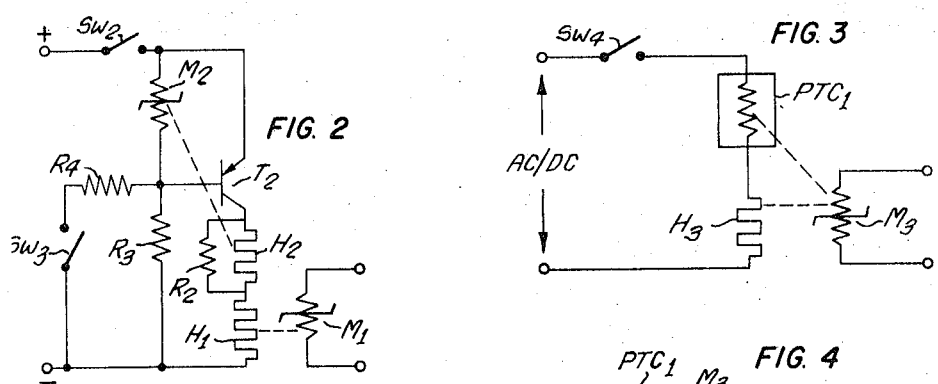
FIG. 2
FIG. 3
FIG. 4
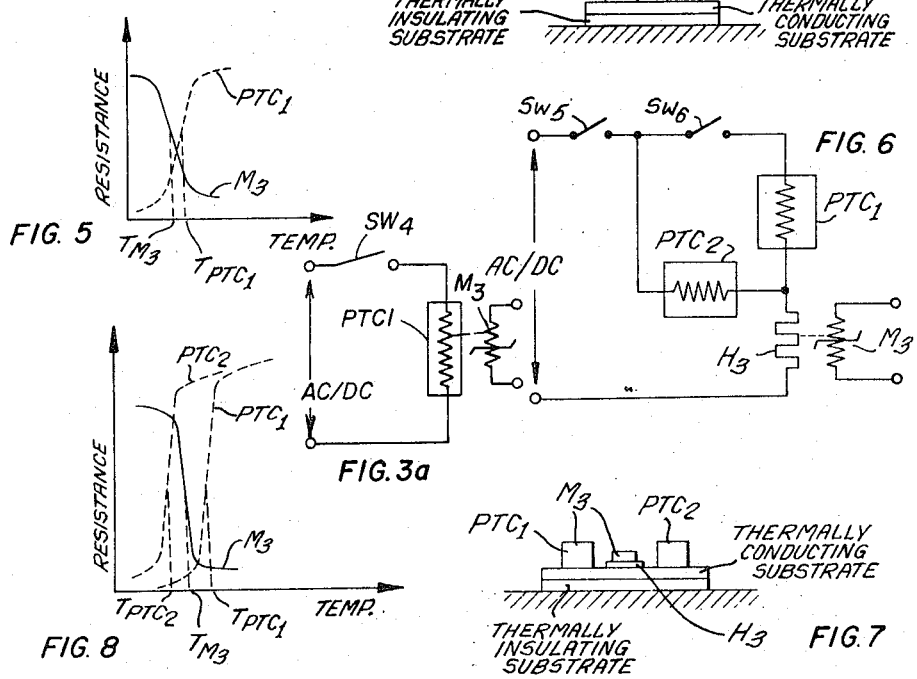
FIG. 5
FIG. 6
FIG. 3a
FIG. 8
FIG. 7

TEMPERATURE COMPENSATED THERMAL RELAY DEVICE

This invention relates to a temperature compensated thermal relay device.

BACKGROUND OF THE INVENTION

Recently, a new type of thermal switching element called a polyconductor has been made available. Polyconductors are materials which change state reversibly from an insulator to a metal at a predetermined transition temperature. A change of resistance from about 100K to about 100 ohms is possible with such materials and this has made these devices suitable for use as thermal sensors and relays. The thermal sensors are switched by the ambient temperature and may or may not incorporate a heater to bias the polyconductor to a temperature near its transition state, whereas the thermal relays incorporate a heater element thermally coupled to the polyconductor to turn the polyconductor on. Such a thermal relay has been disclosed in U.S. application No. 293,323 filed Sept. 28, 1972 by the same assignee as the present application.

In critical applications, problems have been encountered in the use of such thermal relays because they are sensitive to temperature variations. The resulting temperature at the device is influenced primarily by the ambient temperature, the magnitude of the voltage applied to the heater, the voltage applied to the polyconductor, the duty cycle of these voltages, and the packaging and mounting of the device. In order to achieve consistent operation of these devices, it is desirable to apply a large amount of power for a short time to the polyconductor to make it exceed the transition temperature quickly. It is also desirable to control the voltage applied to the heater when it is turned on so as to supply only enough power to keep the polyconductor in the low impedance state (maintain the temperature of the polyconductor a few degrees above the transition temperature). When the device is turnpd off, it is equally desirable to maintain it a few degrees below the transition temperature.

SUMMARY OF THE INVENTION

It is therefore the object of the present invention to provide a temperature compensated thermal relay wherein means are provided for initially supplying a large amount of power to the heater so as to make the thermal switching element exceed its transition temperature quickly and then for reducing the power applied to the heater to maintain the thermal switching element a few degrees above its transition temperature. This will reduce the turn-on and turn-off times of the thermal relay. Means are also provided for controlling the power applied to the heater element to stabilize the operation thereof under varying ambient or operating conditions.

It is also an object of the present invention to provide a temperature compensated thermal relay wherein means are provided for preheating the thermal switching element so as to reduce its turn-on time.

It is a further object of the invention to provide a thermal relay device having high voltage isolation between the input and output terminals thereof.

The temperature compensated thermal relay device comprises a thermal switching element exhibiting a sudden change in impedance at a predetermined transition temperature from a first impedance state to a second impedance state, a heater adapted to be connected to a power source for heating the thermal switching element, and circuit means for initially supplying a large amount of power to the heater so as to make the switching element exceed its transition temperature quickly and reducing the power applied to the heater to maintain the thermal switching element a few degrees above its transition temperature. The circuit means also controls the power applied to the heater to stabilize the operation thereof under varying ambient or operating conditions. This will reduce the turn-on and turn-off times of the thermal relay.

The above circuit means may include a transistor amplifier connected in series with the heater across the power source, a biasing circuit for biasing the transistor amplifier, and a second thermal switching element thermally coupled with the first thermal switching element and connected in the biasing circuit of the amplifier. The second thermal switching element is responsive to the heat generated by the heater for varying the biasing of the amplifier so as to reduce the current flowing therethrough to a value sufficient to maintain the first switching element just above its transition temperature. Because the second thermal switching element is thermally coupled with the first thermal switching element, it will be sensitive to variations in the ambient or operating temperature for varying the biasing of the amplifier in such a manner as to control the power applied to the heater to compensate for the variations in ambient or operating temperature, or power source voltage.

When the second thermal switching element has a negative temperature coefficient, the biasing circuit may be a circuit including a resistor connected in series with the second thermal switching element across the power source. The junction of the second thermal switching element and the resistor is connected to the input of the amplifier, with the second thermal switching element from input to "ground." The resistance value of the resistor is selected so that, upon energization of the relay, the amplifier is driven hard enough on to cause current to flow through the heater to heat the first switching element quickly above its transition temperature. However, upon heating of the second thermal switching element by the heater, the impedance of the second thermal switching element is reduced to such a value as to cause just enough current to flow through the amplifier and the heater to maintain the first switching element just above its transition temperature.

More heating power is normally applied to the first thermal switching element than to the second thermal switching element so as to ensure that the first thermal switching element is in its second impedance state when the relay is energized whereas the second thermal switching element is maintained at substantially the transition temperature. This is done by placing the thermal switching elements so that more heat is applied to the first thermal switching element than to the second thermal switching element. The same result may be obtained by providing a separate heater for each thermal switching element and by shunting the heater of the second thermal switching element by means of a resistor when the heaters are connected in series so as to reduce the power applied thereto (or by inserting a resistor in series with the second heater when the heaters are connected in parallel). The same effect may be achieved by using different resistance values for the heaters to obtain the desired ratio of heating power.

An additional circuit means may be provided for supplying enough power to the heater to maintain the first switching element a few degrees below its transition temperature in the off condition of the relay so as to reduce its turn-on time. In the transistorized relay circuit mentioned above using a second thermal switching element having a negative temperature coefficient, the resistor connected in series with the second thermal switching element in the amplifier input circuit may be selected so as to cause the impedance of the second thermal switching element to bias the amplifier to a condition wherein just enough current flows through the heater of the first thermal switching element to maintain said first thermal switching element just below its transition temperature. This type of circuit is sometimes referred to as a preheating circuit. A second resistor having an impedance lower than the first resistor may be adapted to be connected across the first resistor so as to cause the amplifier to be driven hard enough on to cause the first thermal switching element to exceed its transition temperature and then to be maintained just above its transition temperature.

The first thermal switching element may have a negative temperature coefficient if a normally opened relay is desired. However, a thermal switching element having a positive temperature coefficient can be used when a normally closed relay is required. Similarly, the second thermal switching element placed in the biasing circuit of the amplifier may have a positive or a negative temperature coefficient. However, it will be obvious to someone skilled in the art of electronic circuit design that the type of biasing circuit will depend on the temperature coefficient of the second thermal switching element.

The first and second thermal switching elements may have different impedance values in their first and second impedance state. They may also have different transition temperatures.

The circuit means for initially supplying a large amount of power to the heater and for subsequently reducing the power applied to the heater element so that the first thermal switching element is maintained just above its transition temperature may also include a positive temperature coefficient device connected in series with the heater and thermally coupled to the thermal switching element. A preheating circuit may also be used with such an embodiment and such circuit would include a second positive temperature coefficient device thermally coupled to the thermal switching element. One positive temperature coefficient device will maintain the thermal switching element just below its transition temperature whereas the second positive temperature coefficient device will, upon energization of the relay, cause the thermal switching device to quickly exceed its transition temperature and then stabilize its operation just above its transition temperature.

In the last mentioned embodiment, the heater itself may have a positive temperature coefficient, acting both as a heater and as a positive temperature coefficient device.

In all embodiments of the invention, means are provided to ensure high voltage isolation between the input and output terminals of the relay.

BRIEF DESCRIPTION OF THE DRAWINGS

The invention will now be disclosed, by way of example, with reference to preferred embodiments thereof illustrated in the accompanying drawings in which:

FIGS. 1 and 1a and 2 illustrate temperature compensated thermal relay devices using a transistorized closed loop thermal-electrical circuit;

FIGS. 3, 3a and 6 illustrate temperature compensated thermal relay devices using a positive coefficient temperature device to adjust the power applied to the heater of the switching device by means of a closed loop thermal system;

FIGS. 4 and 7 illustrate schematic diagrams of the structural arrangement of the positive temperature coefficient devices of FIGS. 3 and 6 respectively with respect to the relay device; and FIGS. 5 and 8 illustrate the resistance versus temperature characteristic of the devices of FIGS. 4 and 6 respectively.

DESCRIPTION OF SPECIFIC EMBODIMENTS

Referring to FIG. 1, there is shown a first embodiment of a transistorized relay device including a switching element M1 and a heater H1 for heating the switching element M1. Such thermal relay may be of the type disclosed in the above-mentioned patent application and include a thermal switching element M1 of the negative temperature coefficient type (normally open thermal relay) made of a thin film of vanadium dioxide material deposited on a suitable substrate. It is to be understood that the use of other types of thermal relays is also envisaged, and that the invention is also applicable to thermal switching elements of the positive temperature coefficient type (normally closed thermal relays). The heater H1 is connected in series with a second heater H2 associated with a second switching element M2 which, in the present embodiment, has a negative temperature coefficient. Heaters H1 and H2 are connected in series with the collector-emitter of a transistor T1 across a suitable D.C. source whereas the second thermal switching element M2 is connected across the base-emitted electrodes of the transistor T1.

A resistor R1 is connected in series with the thermal switching element M2 across the D.C. source and the connecting point between resistor R1 and thermal switching element M2 is connected to the base electrode of transistor T1. The value of resistor R1 is selected so that, when switch SW1 is closed, transistor T1 is driven hard on to cause enough current to flow through heater H1 to heat thermal switching element M1 quickly to a temperature above its transition temperature, thus causing switching element M1 to switch to its low impedance state. Heater H2 will also be energized since it is connected in series with heater H1 and thus switching element M2 will also be switched to a low impedance value. This has the effect of reducing the bias applied to the base of transistor T1 and hence reducing the current supplied to heaters H1 and H2. The value of resistor R1 must therefore also be selected so that the low impedance value of the switching element M2 will cause enough conduction through the transistor T1 to maintain the switching element M1 a few degrees above its transition temperature. The switching element M1 will thus be quickly turned on and subsequently maintained a few degrees only above its transition temperature. This will greatly reduce both the turn-on and turn-off times of the relay.

The switching element M2 is closely thermally coupled to switching element M1 and provides temperature compensation for the relay. Indeed, if the ambient or operating temperature at the thermal switching elemnt M1 drops, the temperature of thermal switching element M2 will also drop since the thermal switching elements M1 and M2 are closely coupled thermally. The thermal switching element M2 will thus increase its impedance and so increase the drive on the transistor T1. This increases the power fed to the heaters which raises the temperature of the thermal switching elements M1 and M2 and reduces their impedance back toward the preset value. A reverse action occurs if the ambient or operating temperature increases. A similar compensation action results if there is a change in the power supply voltage.

The heater element H1 is placed in series with the heater element H2 so that the same current flows through the two heaters. A bias resistor R2 is placed in parallel with heater H2 to reduce slightly the current through heater H2 so that the thermal switching element M1 will always be at a lower impedance level than the thermal switching element M2. This ensures that the thermal switching element M1 will always reach the lowest impedance level in the on state and that slightly more power will be applied to thermal switching element M1 than to thermal switching element M2 so that it will be fully turned on before the power is reduced. In addition, thermal switching element M2 is maintained substantially at the transition temperature in the on condition of the relay so as to ensure better temperature compensation.

The same effect may be achieved by using different resistance values for heaters H1 and H2 to obtain the ratio achieved above by the addition of resistor R2. These heaters can be placed in parallel rather than in series if the proper adjustments are made. Another alternative, which may prove to be more desirable, is to use a single heater for the two thermal switching elements M1 and M2 as illustrated in FIG. 1a. The heater must be placed so that more heat is applied to thermal switching element M1 than to thermal switching element M2 for the reasons given above.

Any type of transistor or integrated circuit amplifier circuit may be used to provide and regulate the power applied to the heater of the thermal switching element M1. Indeed, transistor T1 may be replaced by a Darlington pair or some other type of circuit which would achieve the same effect.

Although the invention has been disclosed with reference to a thermal switching element M1 having a negative temperature coefficient, it is to be understood that thermal switching element M1 may obviously have a positive temperature coefficient when a normally closed relay is required. Furthermore, thermal switching element M2 may also have a positive temperature coefficient provided that thermal switching element M2 and resistor R1 are interchanged in the transistor bias circuit.

In order to further reduce the turn-on time of the thermal switching element M1, the circuit of FIG. 1 may be modified as illustrated in FIG. 2 of the drawings. This circuit is similar to the one of FIG. 1 except that a transistor T2 of opposite conductivity has been used and that the polarity of the source is changed. Heaters H1 and H2 are still connected in series with the emitter-collector electrodes of the transistor and resistor R2 connected in parallel with heater H2 to reduce the power applied thereto. A resistor R3 is connected in series with the thermal switching element M2 across the power source. The value of such resistor R3 is selected so that just enough current passes through transistor T2 to maintain the thermal switching element M1 a few degrees below its transition temperature. A resistor R4 is adapted to be connected across resistor R3 to switch transistor T2 into its high conductive state. Resistor R4 shunts resistor R3 and performs the same function as resistor R1 in the embodiment of FIG. 1. The circuit of FIG. 2 therefore provides preheating of the switching element M1 and reduces the turn-on time of the relay.

An alternative configuration using thermal switching elements M1 and M2 of different geometries and therefore of different impedance levels may also be desired. It is often required to make the output thermal switching device M1 reach a very low impedance (less than 100 ohms) when the relay is energized. It is desirable to have thermal switching device M2 operate in a higher impedance range (about 2,000 ohms) so that resistor R3 will be large enough to limit the current flow in the base circuit and thus minimize the power requirements of the device.

In all of these configurations, it is important that the thermal switching element M1 be arranged so that the electrical isolation between it and all the components of the input circuit is complete so that a large voltage (typically greater than 1,500 V.a.c.) can be placed between the two input and output circuits without voltage breakdown or current leakage. This can be achieved by large spacings in air or by the use of some insulating material with high voltage breakdown.

A second embodiment of the invention is illustrated in FIGS. 3 and 4 of the drawings wherein a relay device including a switching element M3 and a heater H3 is switched to its on state by a source of A.C. or D.C. Power fed through a positive temperature coefficient heater device PTC1 having a transition temperature $T_{PTC_1}$ higher than the transition temperature TM3 of the switching element M3. Upon closing switch SW4, a large amount of current is fed to the heater H3 and the PTC1 device to heat the volume on top of the thermally insulating substrate to cause the switching element M3 to exceed its transition temperature quickly. This occurs because the transition temperature TM3 of the thermal switching device M3 is slightly lower than the transition temperature $T_{PTC_1}$ of the PTC1 heater device as illustrated in FIG. 5. However, when the impedance of the PTC1 device increases, the current flow through the heater H3 and the PTC1 device is reduced to such a value as to maintain the switching element M3 just above its transition temperature at point $T_{PTC_1}$. This will reduce the turn-on and turn-off times of the relay. Temperature compensation is obtained by closely coupling thermally the PTC1 heater device and the thermal switching element. This may be done by placing the two devices on a thermally conducting substrate itself positioned over a thermally insulating substrate as illustrated diagramatically in FIG. 4 of the drawings. PTC devices have the characteristic of maintaining a constant temperature when power is applied thereto. Therefore, it will be easily understood that the ambient or operating temperature at the switching element M3 will be held constant at approximately $T_{PTC1}$ because the impedance of the PTC1 device will change to adjust the current through the PTC1 heater device and heater H3 so as to maintain temperature $T_{PTC1}$. This will reduce the power applied when there is an increase of the ambient or operating temperature. A reverse action will occur if the ambient or operating temperature decreases.

The circuit of FIGS. 6 and 7 of the drawings is similar to the one of FIGS. 3 and 4 except that it comprises an additional PTC2 heater device for preheating the switching element M3. Therefore, when switch SW5 alone is closed, the switching element M3 is preheated to a temperature a few degrees below its transition temperature (transition temperature $T_{PTC2}$ of the PTC2 device as shown in FIG. 8). However, when switch SW6 is also closed, the switching element M3 is heated above its transition temperature to switch the relay as disclosed previously. The PTC2 device must also be closely coupled thermally to switching element M3 as illustrated in FIG. 7.

In the embodiments of FIGS. 3, 4, 6 and 7, the PTC devices should be as small as possible to give fast response. In addition, their mass should be larger than that of the relay device so that they will change in temperature and therefore in impedance more slowly than the relay device. The selection of the PTC devices is critical to the operation of the relay device and is dependent on such variables as the size of the relay device, the material and configuration of the package, the size of the PTC devices and the transition temperature of the thermal switching element. The PTC devices may be small so that they will cool quickly when power is removed and the package must be designed with this in mind and in such a way as to cool the thermal switching element quickly. The package must be carefully designed and the devices must be kept small, so that upon removal of power, the thermal switching element may cool quickly, while at the same time the package design allows fast heating without excessive power consumption.

It will also be understood that, in certain cases, the PTC devices alone may be used to heat the thermal switching element M3 and that heater H3 would not be required as illustrated in FIG. 3a. An important function of heater H3 is to limit the current through the PTC devices when power is first applied and thus reduce the size of the PTC devices. If this is not necessary, then heater H3 may be eliminated.

It is also obvious that thermal switching element M3 may have a positive or negative temperature coefficient depending on the type of switch (normally closed or normally open) required.

What we claim is:

1. A temperature compensated thermal relay device comprising:
   a. a thermal switching element exhibiting a sudden change in impedance at a predetermined transition temperature from a first impedance state to a second impedance state;
   b. a heater adapted to be connected to a power source for heating said thermal switching element; and
   c. means including circuit means interconnecting said heater to said power source to initially switch a large amount of power to said heater and make the thermal switching element exceed its transition temperature quickly, and subsequently reduce the power applied to said heater to maintain the thermal switching element a few degrees above its transition temperature, said means also controlling the power applied to said heater to stabilize the operation of the thermal switching element under varying ambient or operating temperatures, varying power supply voltages and switching duty cycles, thereby reducing the turn-on and turn-off times of the relay device.

2. A temperature compensated thermal relay device as defined in claim 1, wherein said circuit means includes a transistor amplifier connected in series with said heater across said power source, a biasing circuit for biasing said transistor amplifier, and another thermal switching element thermally coupled with the first mentioned thermal switching element and connected in the biasing circuit of the amplifier, said another thermal switching element being responsive to the heat generated by said heater for varying the biasing of said amplifier so as to reduce current flowing therethrough to a value sufficient to maintain the first mentioned thermal switching element just above its transition temperature, said another thermal switching element being also sensitive to variations in the ambient or operating temperatures or in power supply voltages and switching duty cycles for varying the biasing of said amplifier in such a manner as to control the power applied to said heater to compensate for said variations.

3. A temperature compensated thermal relay device as defined in claim 2, wherein the another thermal switching element has a negative temperature coefficient and wherein said biasing circuit includes a resistor connected in series with said second thermal switching element across said power source, said another thermal switching element being connected in the base-emitter circuit of said transistor amplifier and the resistance value of said resistor being such that, upon energization of the relay device, the transistor amplifier is driven hard enough on to cause current to flow through the heater to heat the first switching element quickly above its transition temperature, but, upon heating of the another switching element by the heater, the impedance of the another thermal switching element is reduced to such a value as to cause just enough current to flow through the heater to maintain the first mentioned thermal switching element just above its transition temperature.

4. A temperature compensated thermal relay device as defined in claim 2, wherein more heating power is applied to said first mentioned thermal switching element than to said another thermal switching element so as to make sure that said first mentioned thermal switching element is in its second impedance state whereas said another thermal switching element is maintained at substantially the transition temperature in the operated condition of the relay device.

5. A temperature compensated thermal relay device as defined in claim 2, wherein the heater heats the first thermal switching element alone and wherein said circuit means further comprises another heater disposed for heating said another thermal switching element, and wherein more power is applied to said first mentioned heater than to said another heater so as to ensure that said first mentioned thermal switching element is in its another impedance state whereas said another thermal switching element is maintained at substantially the transition temperature in the operated condition of the relay device.

6. A temperature compensated thermal relay device as defined in claim 5, wherein said first and second mentioned heaters are connected in series and wherein a resistor is connected in parallel with the second heater to reduce the power applied thereto.

7. A temperature compensated thermal relay device as defined in claim 1 wherein additional circuit means are provided for supplying enough power to said heater to maintain the switching element a few degrees below its transition temperature in the off condition of the relay device so as to reduce its turn-on time.

8. A temperature compensated thermal relay device as defined in claim 2, wherein additional circuit means are provided for biasing said transistor amplifier so as to maintain the first mentioned switching element a few degrees below its transition temperature in the off condition of the relay device so as to reduce its turn-on time.

9. A temperature compensated thermal relay device as defined in claim 2, wherein said another thermal switching element has a negative temperature coefficient and wherein said biasing circuit includes a first resistor connected in series with said another thermal switching element across the power source, said another thermal switching element being connected in the base-emitter circuit of the transistor amplifier and the resistance value of said first resistor being such that enough current flows through the transistor amplifier so as to maintain the first mentioned thermal switching element just below its transition temperature, and wherein a second resistor is connected across said first resistor when the relay device is energized so as to drive the transistor amplifier in such a manner as to cause the first mentioned switching element to quickly exceed its transition temperature but, upon heating of the another switching element by the heater, the impedance of the another switching element is reduced to such a value as to cause just enough current to flow through the heater to maintain the first mentioned switching element just above its transition temperature.

10. A temperature compensated thermal relay device as defined in claim 1 wherein said thermal switching element has a negative temperature coefficient.

11. A temperature compensated thermal relay device as defined in claim 2, wherein said first and second mentioned thermal switching elements both have negative temperature coefficients.

12. A temperature compensated thermal relay device as defined in claim 2, wherein said first and second mentioned thermal switching elements have different impedance values in their respective first and second impedance states.

13. A temperature compensated thermal relay device as defined in claim 12, wherein said first and second mentioned thermal switching elements have different transition temperatures.

14. A temperature compensated thermal relay device as defined in claim 1, wherein said circuit means includes a positive temperature coefficient device connected in series with said heater and thermally coupled to said thermal switching element, said positive temperature coefficient device having a transition temperature higher than the transition temperature of said thermal switching element so as to initially supply a large amount of power to said heater and, due to its positive temperature coefficient, subsequently reduce the power applied to said heater, said positive temperature coefficient device being also sensitive to variations in the ambient or operating temperatures or in the power supply voltages and switching duty cycles for controlling the power applied to said heater to compensate for said variations.

15. A temperature compensated thermal relay device as defined in claim 14, further comprising additional circuit means including a second positive temperature coefficient device connected in series with said heater and thermally coupled to said thermal switching element, said second positive temperature coefficient device having a transition temperature lower than the transition temperature of said thermal switching element and being used for supplying just enough power to said heater to maintain the thermal switching element a few degrees below its transition temperature in the off condition of the relay device so as to reduce its turn-on time.

16. A temperature compensated thermal relay device as defined in claim 1, wherein said heater has a positive temperature coefficient.

17. A temperature compensated thermal relay device as defined in claim 14, wherein said thermal switching element has a negative temperature coefficient.

* * * * *